United States Patent
Kouyama

(10) Patent No.: US 9,858,447 B2
(45) Date of Patent: Jan. 2, 2018

(54) LASER MARKER CAPABLE OF SETTING OPTIMUM PRINT PATTERN MAKING UP TWO-DIMENSIONAL CODE PRINTED ON WORKPIECE

(71) Applicant: BROTHER KOGYO KABUSHIKI KAISHA, Nagoya, Aichi (JP)

(72) Inventor: Masatoshi Kouyama, Gifu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/270,397

(22) Filed: Sep. 20, 2016

(65) Prior Publication Data

US 2017/0011236 A1     Jan. 12, 2017

Related U.S. Application Data

(63) Continuation-in-part of application No. PCT/JP2015/060105, filed on Mar. 31, 2015.

(30) Foreign Application Priority Data

Mar. 31, 2014    (JP) .................................. 2014-070770

(51) Int. Cl.
   *B41M 5/24*     (2006.01)
   *G06K 1/12*     (2006.01)
   (Continued)

(52) U.S. Cl.
   CPC ............ *G06K 1/121* (2013.01); *B23K 26/082* (2015.10); *B41M 5/24* (2013.01); *G06K 5/02* (2013.01); *G06K 7/146* (2013.01)

(58) Field of Classification Search
   CPC ...... G06K 1/121; G06K 7/146; G06K 7/1434; G06K 7/1404; B41M 5/24; B23K 26/082
   See application file for complete search history.

(56) References Cited

U.S. PATENT DOCUMENTS 8,890,917 B2 * 11/2014 Matsuda ............... G06F 3/1208
                                                           347/110
2012/0024967 A1    2/2012 Chen

FOREIGN PATENT DOCUMENTS

JP    2001-108932 A    4/2001
JP    2001-300747 A    10/2001
   (Continued)

OTHER PUBLICATIONS

International Search Report and Written Opinion with the English translation of the ISR issued in the corresponding International Application No. PCT/JP2015/060105 dated Jun. 30, 2015.
(Continued)

*Primary Examiner* — Julian Huffman
*Assistant Examiner* — Michael Konczal
(74) *Attorney, Agent, or Firm* — K&L Gates LLP

(57) ABSTRACT

A laser marker enables efficient determination of an optimum condition for a printing pattern of a two-dimensional code and simplification of the evaluation operation of the printing pattern of the two-dimensional code. A printing pattern regarding a cell to be printed in each of reference cells of a two-dimensional code is generated. The two-dimensional code is printed in this cell printing pattern. The recognition rate of the two-dimensional code is calculated on the basis of the reference cells. When the recognition rate is a predetermined value or more, a present printing pattern is stored as an optimum condition (optimum printing pattern) in a database. In contrast, when the recognition rate is less than the predetermined value, the size of cells constituting the present printing pattern is changed. The two-dimensional code is printed in the changed cell printing pattern, and the recognition rate of the two-dimensional code is calculated again.

10 Claims, 6 Drawing Sheets

(51) Int. Cl.
   *G06K 7/14*       (2006.01)
   *B23K 26/082*     (2014.01)
   *G06K 5/02*       (2006.01)

(56)             References Cited

FOREIGN PATENT DOCUMENTS

JP       2005-186080 A     7/2005
JP       2011-056910 A     3/2011
JP       2012-096478 A     5/2012
JP       2012-148309 A     8/2012

OTHER PUBLICATIONS

International Preliminary Report on Patentability with the English translation issued in the corresponding International Application No. PCT/JP2015/060105 dated Oct. 4, 2016.

* cited by examiner

LASER MARKER CAPABLE OF SETTING OPTIMUM PRINT PATTERN MAKING UP TWO-DIMENSIONAL CODE PRINTED ON WORKPIECE

CROSS REFERENCE TO RELATED APPLICATION

This application is a continuation-in-part application of International Application No. PCT/JP2015/060105 filed Mar. 31, 2015 in the Japan Patent Office acting as Receiving Office, claiming priority from Japanese Patent Application No. 2014-070770 filed Mar. 31, 2014. The entire contents of each of these applications are incorporated herein by reference.

TECHNICAL FIELD

The following disclosure relates to a laser marker for machining a workpiece with a laser. In a typical example of the machining, two-dimensional codes are printed by focusing a laser on the workpiece.

BACKGROUND

According to a conventional laser marker, an image such as a two-dimensional code is printed on a workpiece by focusing a laser on the workpiece.

Optimum conditions for printing the two-dimensional code may vary depending upon the material of a workpiece, size of the two-dimensional code, etc. Further, parameters for setting the printing condition may be intricately correlated with one another. As such, setting the optimum printing condition while adjusting the relevant parameters is a troublesome work for a user.

Specifically, the material of the workpiece and specification of the laser may change printing quality of the two-dimensional code. This means that these parameters exert great influence upon a recognition rate of the two-dimensional code printed on the workpiece.

Japanese Patent Application Publication Nos. 2011-56910 and 2012-148309 propose enhancing printing quality by providing a predetermined printing pattern while considering variation in heat distribution which differs depending upon a print pattern or by providing a printing pattern relevant to the material of the workpiece.

Japanese Patent Application Publication No. 2012-148309 proposes evaluating the printed results by extracting print evaluation pattern from imaging results of the printed results in which the print evaluation pattern is included.

SUMMARY

However, since there are a large number of printing patterns and print-evaluation patterns that are different depending upon the material of the workpiece and the specification of the laser, preparation of those data requires much labor. Further, selecting a printing pattern and a print evaluation pattern from huge quantities of data is a hard work and evaluating quality of the pattern printed on the basis of the selected printing pattern and print evaluation patterns would be extremely troublesome.

In view of the above-described drawbacks, it is an object of the present disclosure to provide a laser marker capable of efficiently determining an optimum condition of the printing pattern of the two-dimensional code, and facilitating evaluation work with respect to the printing pattern of the two-dimensional code.

In order to attain the above and other objects, one aspect provides a laser marker that includes a laser oscillation unit; a scanner; a laser converging unit; a print pattern generator; a two-dimensional code; a recognition rate computing unit; a print pattern changing unit; and a storage. The laser oscillation unit is configured to emit a laser beam. The scanner is configured to scan the laser beam emitted from the laser oscillation unit. The laser converging unit is configured to receive the scanning laser beam and converge the scanning laser beam onto a workpiece. The print pattern generator is configured to generate print patterns different in area size, each of the print patterns being printed within a preselected reference cell that makes up a two-dimensional code printed on the workpiece by the scanning laser beam. The two-dimensional code recognition device is configured to recognize the two-dimensional code printed on the workpiece. The recognition rate computing unit configured to compute a recognition rate with respect to at least a part of the two-dimensional code recognized by the two-dimensional code recognition device. The print pattern changing unit is configured to change the print pattern until the recognition rate of the printed print pattern has become equal to or greater than a threshold value. The storage stores a database, the print pattern having the recognition rate equal to or greater than the threshold value being added to the database as being an optimum print condition.

BRIEF DESCRIPTION OF THE DRAWINGS

The particular features and advantages of the invention as well as other objects will become apparent from the following description taken in connection with the accompanying drawings, in which.

DETAILED DESCRIPTION

A structure of a laser marker according to one embodiment will be described with reference to the accompanying drawings. The terms "upward", "downward", "upper", "lower", "above", "below", and the like will be used throughout the description assuming that a laser marker is disposed in an orientation in which it is intended to be used.

Figure 1:
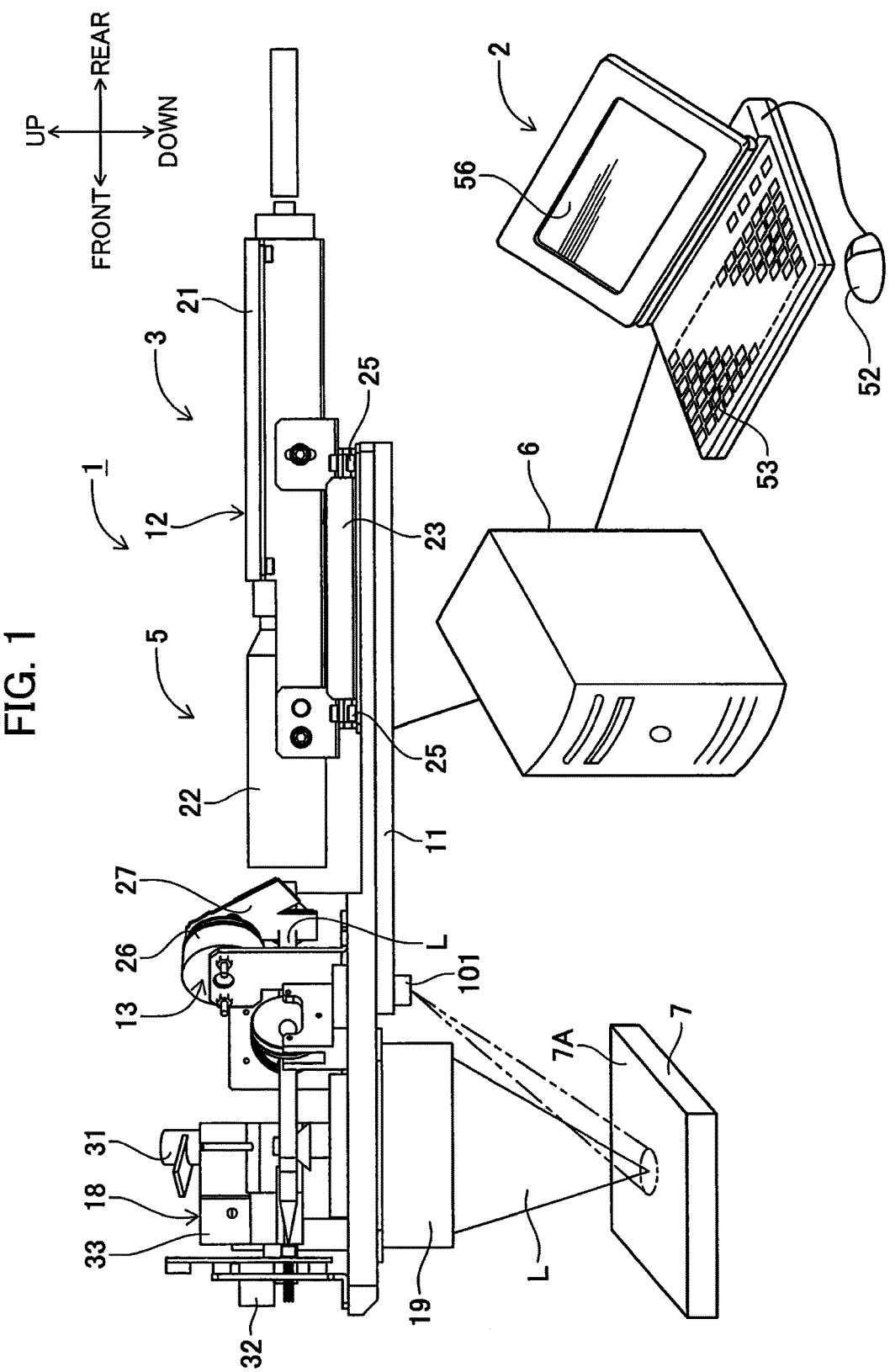
FIG. 1 is a schematic view of a laser marker according to one embodiment.

As shown in FIG. 1, a laser marker 1 according to one embodiment includes a personal computer (PC) 2 and a laser machining device 3. Connected to the PC 2 are a mouse 52, a keyboard 53, and a liquid crystal display (LCD) 56. The PC2 is an example of the claimed print pattern generator, recognition rate computing unit, and print pattern changing unit.

The laser machining device 3 includes a laser scan head 5 and a galvano/laser controller 6. The laser scan head 5 scans the machining surface 7A of a workpiece 7 two-dimensionally to machine or print a two-dimensional code thereon.

A computer is used for the galvano/laser controller 6. The galvano/laser controller 6 is connected to the PC 2 so as to be capable of performing bi-directional communications therebetween. The galvano/laser controller 6 is also electrically connected to the laser machining device 3. The PC 2 outputs print data, control parameters, and various other instruction data to the galvano/laser controller 6, and in response thereto, the galvano/laser controller 6 drives the laser scan head 5. In other words, the galvano/laser controller 6 governs the laser scan head 5 in its entirety.

Leftward, rightward, upward and downward directions in FIG. 1 correspond to frontward, rearward, upward and downward directions of the laser machining device 3, respectively. The directions perpendicular to both the upward/downward directions and leftward/rightward directions are leftward and rightward directions of the laser machining device 3.

As shown in FIG. 1, the laser machining device 3 includes a main base 11, laser oscillation unit 12 configured to emit a laser beam L, a light shutter 13, a light damper (not shown), a galvano-scanner 18, and an f θ lens 19. The laser machining device 3 thus configured is housed in a housing (not shown) that is generally of a parallelepiped shape. The galvano-scanner 18 is an example of the claimed scanner, and the f θ lens 19 is an example of the claimed laser converging unit.

The laser oscillation unit 12 includes a laser oscillator 21, a beam expander 22, and a mounting base 23. The laser oscillator 21 is configured to oscillate or emit $CO_2$ laser, YAG laser or the kind. With such laser beam L emitted from the laser oscillator 21, marking or printing of a two-dimensional code is performed on the machining surface 7A of the workpiece 7. The beam expander 22 is provided for adjusting the diameter of the laser beam L. The beam expander 22 can reform the laser beam L to, for example, increase the beam diameter. The beam expander 22 and laser oscillator 21 are disposed in alignment with each other or arranged side-by-side on the same axis. The laser oscillator 21 is mounted on the mounting base 23 so that the laser oscillator 21 can adjust the orientation of an optical axis of the laser beam L. The mounting base 23 is fixedly secured with screws 25 to the upper surface of the main base 11 at a rear position thereof.

The light shutter 13 includes a shutter motor 26 and a plate shaped shutter 27. A stepping motor is used for the shutter motor 26. The shutter 27 is attached in coaxial relation to the shaft of the shutter motor 26 so as to rotate together with the motor shaft. When the shutter 27 is rotationally brought to a position where the laser beam L outputted from the beam expander 22 is interrupted, the laser beam L is reflected on the shutter 27 and directed toward the optical damper disposed rightwardly of the light shutter 13. On the other hand, when the shutter 27 is rotationally brought to a position where the laser beam L outputted from the beam expander 22 is allowed to pass therethrough, the laser beam L enters into the galvano-scanner 18.

The optical damper absorbs the laser beam L entering thereinto upon reflecting on the shutter 27. A cooling device (not shown) is provided for cooling the optical damper.

An opening is formed in a front portion of the main base 11. The galvano-scanner 18 is disposed above the opening of the main base 11 and directs the laser beam L downward through the opening and performs two-dimensional scan. More specifically, the galvano-scanner 18 includes a galvano X-axis motor 31 and a galvano Y-axis motor 31 which are mounted on the main unit 33. To perform the two-dimensional scan of the laser beam L, the shafts of the two motors are inserted into the respective openings formed in a main unit 33. The motor shafts of the two motors 31 and 32 are arranged orthogonal to each other and a scan mirror is movably attached to the tip end of each motor shaft. The two scan mirrors diagonally face each other and perform two-dimensional scans while moving in cooperation with each other. Controlling the rotations of the motors 31 and 32 changes the rotational positions of the respective scan mirrors. Thus, the laser beam L is directed downward and performs two-dimensional scans including frontward/rearward scans (X direction) and leftward/rightward scans (Y direction).

The f θ lens 19 operates to collimate the two-dimensionally scanning laser beam L onto the machining surface 7A of the workpiece 7 disposed below the main unit 33. Accordingly, by controlling the rotations of the motors 31 and 32, the laser beam L performs two-dimensional scan in both frontward/rearward (X direction) and leftward/rightward direction (Y direction) on the machining surface 7A of the workpiece 7, thereby forming a desired print pattern on the workpiece 7.

A two-dimensional code recognition device 101 has a function to read at least a part of the two-dimensional code marked or printed on the machining surface 7A of the workpiece 7. The two-dimensional code recognition device 101 is fixedly mounted on the main base 11.

An electrical arrangement of the laser marker 1 according to one embodiment will be described with reference to FIG. 2.

Figure 2:
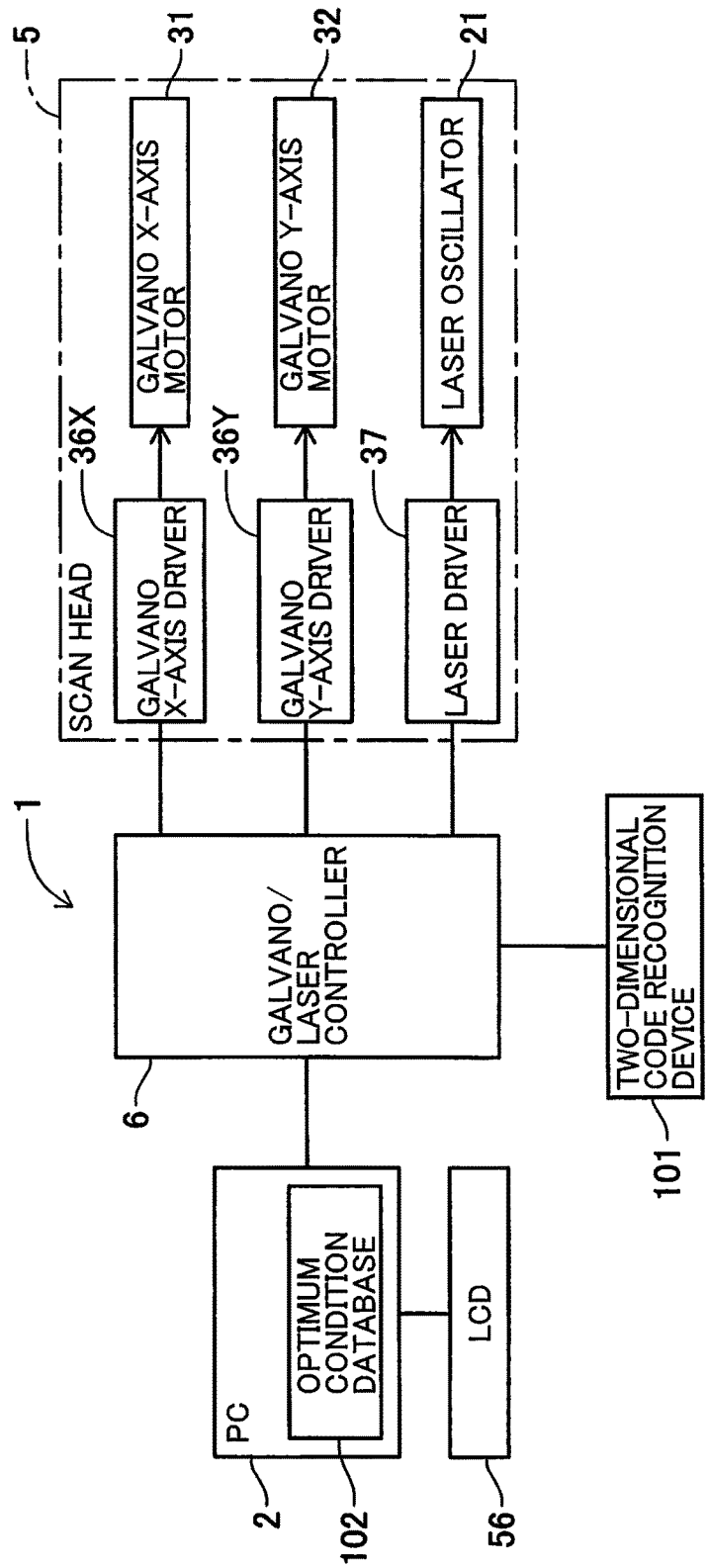
FIG. 2 is a block diagram showing a control performed in the laser marker.

As shown in FIG. 2, the laser marker 1 according to the embodiment includes the laser scan head 5, galvano/laser controller 6 and personal computer (PC) 2.

The laser scan head 5 includes a laser driver 37, galvano-drivers 36X and 36Y. The laser driver 37, and galvano-drivers 36X and 36Y are connected to the galvano/laser controller 6.

The laser driver 37 is connected to the laser oscillator 21 provided within the laser scan head 5. The galvano-drivers 36X and 36Y are connected to the galvano X-axis motor 31 and galvano Y-axis motor 32, respectively. Both motors 31 and 32 are disposed in the galvano-scanner 18 (see FIG. 1) provided in the laser scan head 5.

As described above, the galvano/laser controller 6 is connected to the laser driver 37, and galvano-drivers 36X and 36Y which are provided in the laser scan head 5. Also, the galvano/laser controller 6 is connected to the two-dimensional code recognition device 101 fixed to the main base 11 (see FIG. 1) of the laser scan head 5. The galvano/laser controller 6 is further connected with wire to the PC 2.

The PC 2 is installed with an optimum condition database 102. The LCD 56 is connected to the PC 2. The optimum condition database 102 is an example of the claimed storage.

Next, referring to FIGS. 3 to 7, description will be made with respect to a control for determining an optimum condition for printing a two-dimensional code with the laser marker 1 according to the embodiment.

Figure 5:
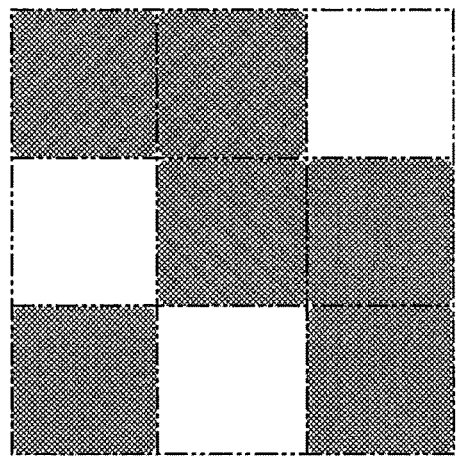
FIG. 5 is a view showing a two-dimensional code with which an optimum printing pattern is determined in the laser marker according to the embodiment.

A 3×3 matrix as shown in FIG. 5 is an example of the two-dimensional code to be marked or printed on the machining surface 7A of the workpiece 7 with the laser marker 1 according to the embodiment. In the two-dimensional code in the form of 3×3 matrix, each of nine collegial square regions will be referred to as a "reference cell". The reference cell is indicated by two-dotted-chain lines in FIGS. 5 and 7. As shown in FIG. 5, particular reference cells are laser scanned and the remaining reference cells are not laser scanned, thereby forming specific one of $2^9$ different patterns.

Figure 6:
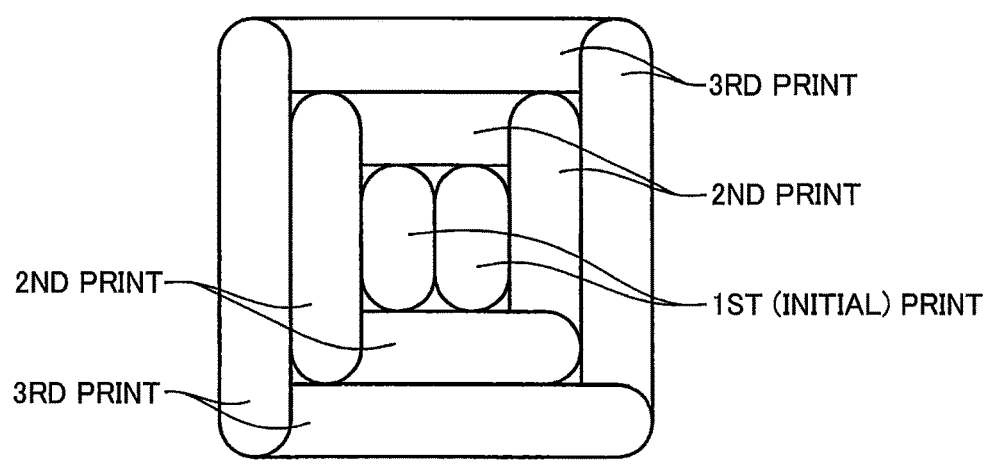
FIG. 6 is an explanatory diagram for enlarging a print area in a reference cell to be printed in determining the optimum printing pattern in the laser marker according to the embodiment.

FIG. 6 is an explanatory diagram for enlarging a print area in a reference cell to be printed. In each reference cell to be printed, the print region is enlarged step-by-step to grow or enlarge up to a relevant regional size. More specifically, in the first print step, the smallest print region substantially in square shape is formed by two line segments printed by the laser beam L. The two line segments are juxtaposed to extend in the same direction, e.g., X-direction. In the second print step executed following the first print step, four line segments longer than those printed in the first print step are printed to surround or confine the smallest print region, thereby providing the second smallest print region. Of the four line segments printed by the laser beam L in the second print step, two line segments are printed to extend in the same direction, e.g., X-direction, and the remaining two opposing line segments are printed to extend in the direction orthogonal to the direction in which another two line segments extend, e.g., Y-direction. The four line segments printed in the second print step are positioned to surround or confine the smallest print region formed in the first print step. In the third print step executed following the second print step, another four line segments longer than those printed in the second print step are printed to surround or confine the second smallest print region, thereby providing the third smallest print region. Of the four line segments formed by the laser beam L in the third print step, two opposing line segments are printed to extend in the same direction, e.g., X-direction, and the remaining two opposing line segments are printed to extend in the direction orthogonal to the direction in which another two line segments extend, e.g., Y-direction. The four line segments printed in the third print step are positioned to surround or confine the second smallest print region formed in the second print step.

Figure 7:
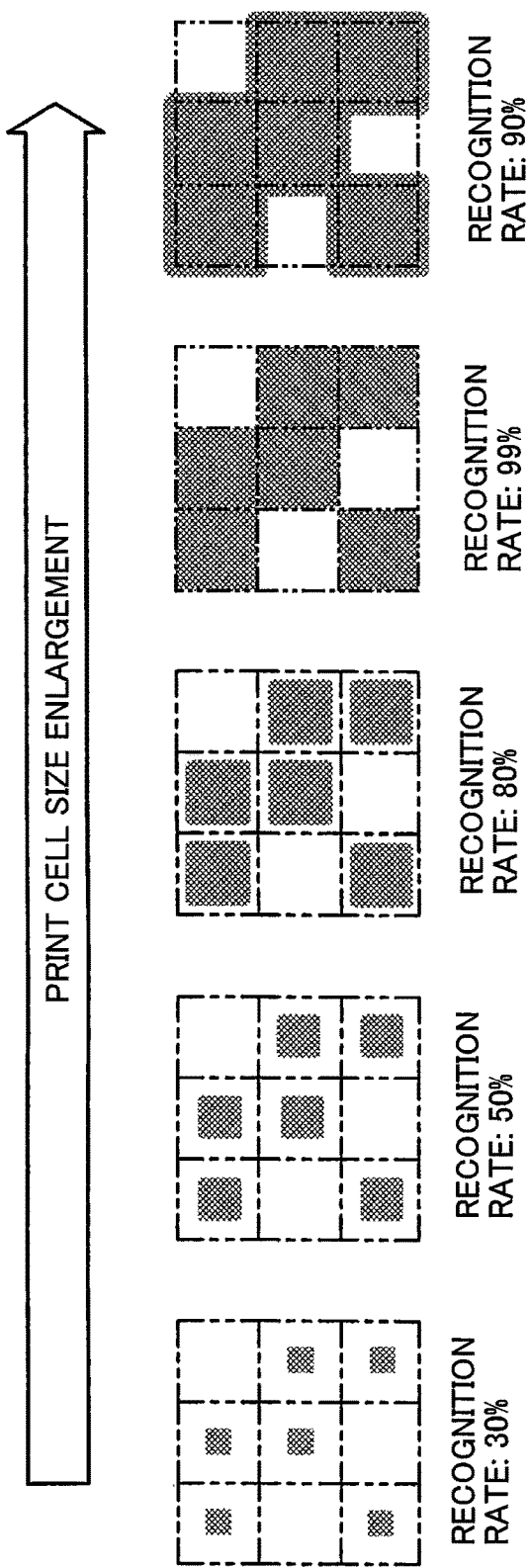
FIG. 7 is a view for description of the relationship between a recognition rate and the enlargement of an outline of the printed cell in the reference cell in determining the optimum printing pattern in the laser marker according to the embodiment.

In this manner, the print regional area in the reference cell to be printed is gradually enlarged or grown from the center of the reference cell as shown in FIG. 7. As the enlargement of the print region progresses, a recognition rate increases. The term "recognition rate" as used herein is intended to mean a ratio of an area of printed region within a reference cell to be printed to an area of the reference cell or a ratio of the area of reference cell to the area of printed region within the reference cell to be printed, i.e., reciprocal of the former definition of the recognition rate. When the area of the printed region in the reference cell to be printed and the area of reference cell are equal to each other, the recognition rate is 100%. In the example shown in FIG. 7, the recognition rate for the print results achieved by the first print step is 30%. The recognition rate gradually increases as the print step proceeds. If the print steps proceed too farther, the printed area becomes greater than the area of reference cell, resulting in, for example, 90% recognition rate, as shown in the rightmost example of FIG. 7.

Provided that the thickness of the printed line segments (see FIG. 6) is approximately equal to the diameter of the laser beam L set in advance, printing could be executed to be exactly in the same size as the reference cell, i.e., with 100% recognition rate insofar as there is no overlapping portion in neighboring line segments extending in the same direction. However, in actual printing, the thickness of the line segment formed by the laser beam L is not always equal to the diameter of the laser beam L, but may vary depending upon the material of the workpiece 7, marking condition, and the like. If the line segment formed by the laser beam L is thicker than the diameter of the laser beam L, then two adjacent line segments overlap and the resultant print pattern becomes larger than the intended size. Print unevenness would occur with respect to print overlapped portion and non-overlapped portion.

Next, description will be made with respect to a control for determining an optimum condition for printing a two-dimensional code with the laser marker 1 according to the embodiment with reference to the flowcharts shown in FIGS. 3 and 4. Programs for the flowcharts shown in FIGS. 3 and 4 are stored in a ROM of the PC 2 and are executed by the PC 2.

Figure 3:
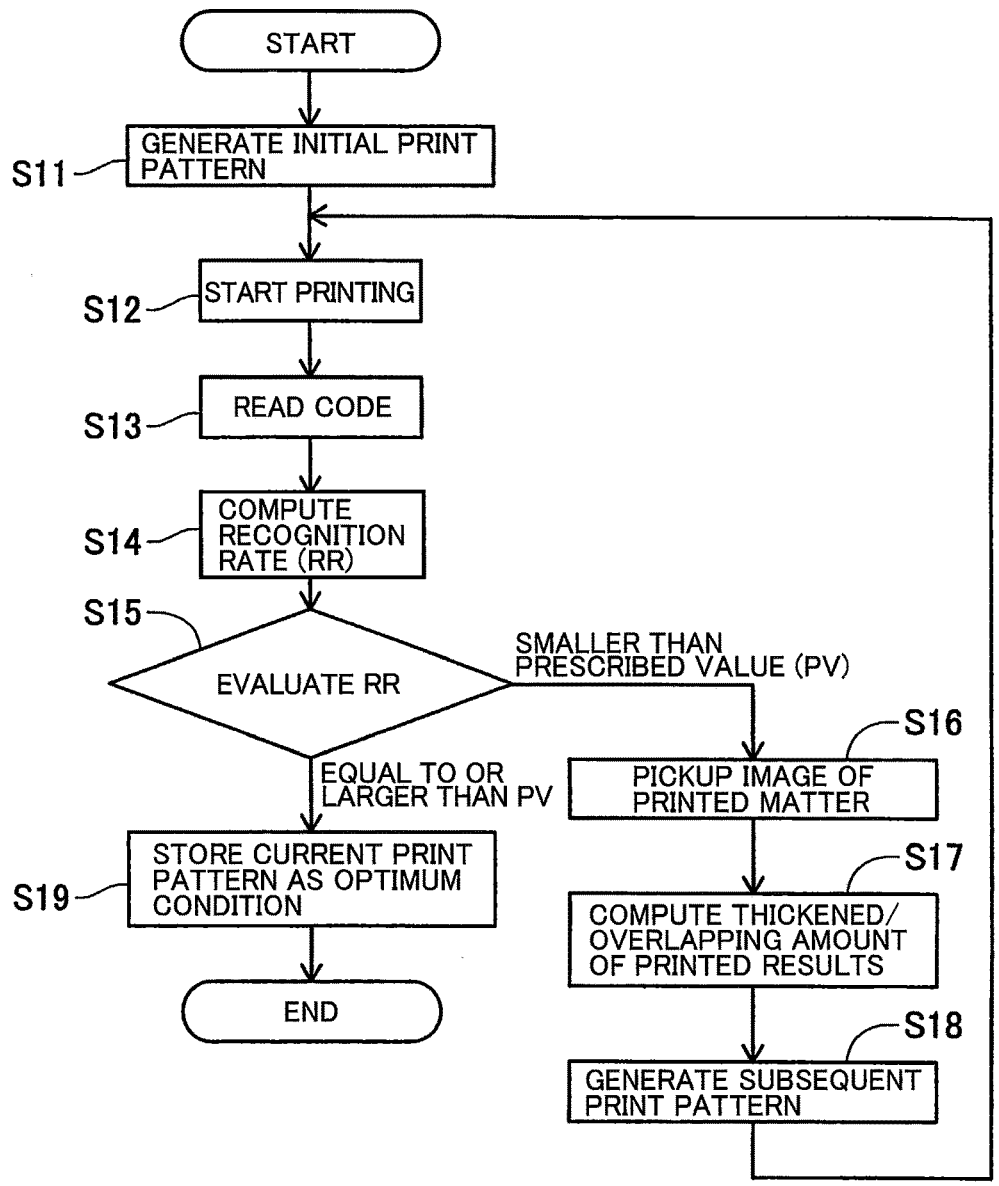
FIG. 3 is a flow chart showing a control routine for performing two-dimensional code marking (printing) on a workpiece in a case where marking on the workpiece with its material has not ever been experienced.
Figure 4:
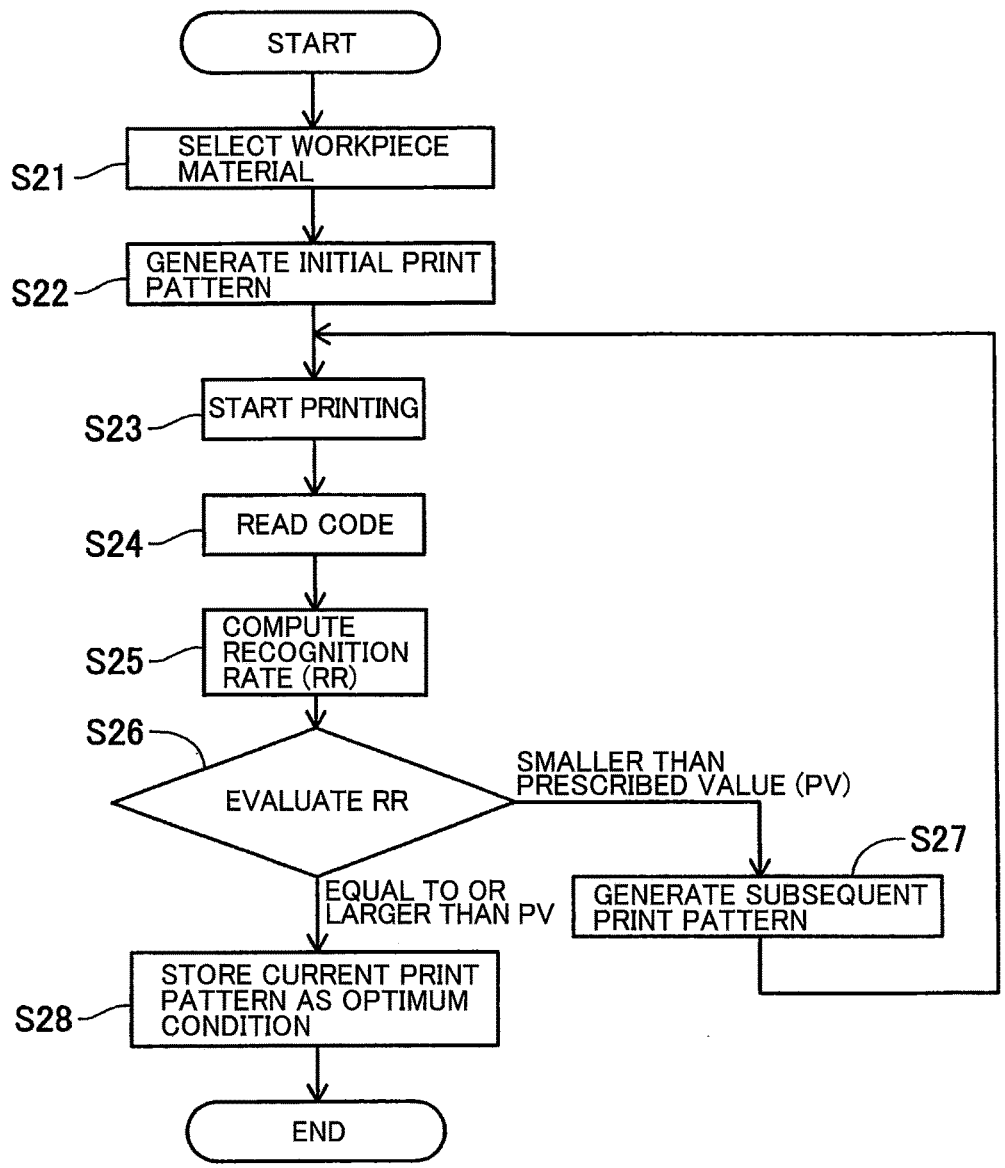
FIG. 4 is a flowchart showing a control routine for performing two dimensional code marking (printing) on a workpiece in a case where marking on the workpiece with its material has been experienced.

When a workpiece subject to laser marking or printing is new in terms of material, that is, when laser marking or printing to such a workpiece has never been performed and is performed for the first time, the flowchart illustrated in FIG. 3 is executed.

In S11, an initial or first print pattern is generated. An example of the initial print pattern is the smallest print pattern shown in FIG. 6.

In S12, the machining surface 7A of the workpiece 7 is laser marked or printed with the initial print pattern thus generated. The print pattern for the firstly executed printing shown in FIG. 6 is laser marked at the center of each reference cell constituting the two-dimensional code.

In S13, a part of the initial print pattern marked on the machining surface 7A of the workpiece 7 is read with the two-dimensional code recognition device 101.

In S14, a recognition rate is computed on the basis of the information read by the two-dimensional code recognition device 101. When a digital camera is used as the two-dimensional code recognition device 101, the information read by the digital camera in S13 is a partial image of the initial print pattern. In this case, the recognition rate is computed through image processing. Specifically, in the image processing, an area of the reference cell and the area printed within the reference cell are obtained, and the recognition rate is computed on the basis of the data thus obtained. Alternatively, the recognition rate may be obtained by an average density. The image captured by the digital camera shows differences in density in portions where printing has been performed and printing has not been performed.

In S15, the recognition rate computed in S14 is evaluated. Specifically, determination is made as to whether or not the computed recognition rate is equal to or larger than a prescribed value. If it is the case, the routine proceeds to S19, and if it is not the case, i.e., when the computed recognition rate is smaller than the prescribed value, the routine proceeds to S16. The initial print pattern generated in S11 is set to be smaller than the prescribed value.

In S16, the initial print pattern printed on the machining surface 7A of the workpiece 7 is picked up by a digital camera. When a digital camera is used as the two-dimensional code recognition device 101 and an image of the printed initial print pattern is available through the processing in S13, such an image can be used in S16.

In S17, a thickened amount and an overlapping amount for the printed initial print pattern are computed with respect to the image picked up in S16. The term "thickened amount" refers to an extended width of an actual print line width as compared with a line width intended to be formed on the machining surface 7A of the workpiece 7. The term "overlapping amount" refers to an amount of overlapped area or width between two adjacent print lines. For example, the thickened amount is computed on the basis of the actual print line width of the printed initial print pattern. The computed thickened amount and the overlapping amount are stored in a memory of the PC 2.

In S18, the second print pattern is generated while referring to the thickened amount or the overlapping amount obtained in S17. The second print pattern is generated to be free from the overlapping amount between the printed line of the initial print pattern and a print line to be formed adjacent to this previously printed line.

Upon execution of S18, the routine returns to S12, and processings in S12-S15 are executed with respect to the second print pattern. In S17, the thickened amount and the overlapping amount are computed on the basis of the print line thickness of the initial print pattern and adjacent print line width of the second print pattern. The computed thickened amount and the overlapping amount are stored in the memory of the PC 2.

Upon execution of the processing in S18, the routine returns to S12, and processings in S12-S15 are repeatedly executed with respect to the third print pattern. In this manner, as far as the recognition rate evaluated in S15 indicates that the recognition rate is smaller than the prescribed value, processings in S12-S18 are repeatedly executed.

When the recognition rate evaluated in S15 indicates that the recognition rate is equal to or larger than the prescribed value, the routine proceeds to S19 where the updated print pattern is stored in the database 102 as an optimum condition (or optimum print pattern). Whenever the same size two-dimensional code is printed on the workpiece of the same material, the optimum condition for such two-dimensional code is retrieved from the database 102 and printing is performed in accordance with the optimum condition.

In order to utilize the optimum condition stored in the flowchart of FIG. 3, the control illustrated in the flowchart of FIG. 4 is executed. The flowchart of FIG. 4 is similar to the flowchart of FIG. 3 except for the addition of process of S21 in the flowchart of FIG. 4 and omission of S16 and S17 in the flowchart of FIG. 3 from the flowchart of FIG. 4. Specifically, S22-S28 of FIG. 4 correspond to S11-S15, S18 and S19, respectively. Accordingly, duplicate description is omitted herein.

In S21 of the flowchart of FIG. 4, a material of the workpiece on which a two-dimensional code is printed is selected from a group of materials registered through the processes executed by the flowchart of FIG. 3. Once the material is selected in S21, then gradually enlarging print patterns are sequentially printed on the machining surface 7A of the workpiece 7 so that the adjacent two print lines do not overlap but juxtaposed with no gap or space therebetween. To this effect, used are the thickened amount and the overlapping amount stored during execution of the processes illustrated in the flowchart of FIG. 3.

Insofar as the material of the workpiece 7 is registered and selectable in S21, a two-dimensional code of a desired size can be printed with the optimum condition. Specifically, when the two-dimensional code to be printed is made up of a plurality of reference cells, each being larger in size than the one registered in the database, the printed results are free from the overlapping portion between two adjacent print lines.

Although the description has been made in detail with reference to specific embodiments, it will be appreciated by one skilled in the art that a variety of changes may be made without departing from the scope of the above described aspects.

For example, print patterns to be printed on the machining surface 7A are not limited to the print pattern printed in each cell of the 3×3 reference cells as shown in FIG. 5. More specifically, print pattern printed in 1×1 reference cell, i.e., one reference cell may be used, and print patterns printed in any number of reference cells may be used.

Further, in the first (initial) print step shown in FIG. 6, the print region is formed in a substantially square shape by marking or printing two line segments. However, the present description is not limited to this, but a print region may be formed by marking or printing single line segment in the first (initial) print step.

In the laser marker 1 according to the embodiment, the print thickness of the two-dimensional code printed on the machining surface 7A of the workpiece 7 (thickness of the printed line segments formed by the laser beam 7) may be adjusted by changing the speed of the laser scan of the galvano-scanner 18. Accordingly, it is facilitated to print the two-dimensional code on the workpiece (S12, S23) by changing the size of cells constituting the current printing pattern and generating the print pattern printed in the cells having the changed size (S18, S23).

What is claimed is:

1. A laser marker comprising:
a laser oscillator configured to emit a laser beam;
a scanner configured to scan the laser beam emitted from the laser oscillator;
a laser converging device configured to receive the scanning laser beam and converge the scanning laser beam onto a workpiece;
a print pattern generator configured to generate print patterns different in area size, each of the print patterns being printed within a preselected reference cell that makes up a two-dimensional code printed on the workpiece by the scanning laser beam;
a two-dimensional code recognition device configured to recognize the two-dimensional code printed on the workpiece;
a storage storing a database; and
a controller configured to:
compute a recognition rate with respect to at least a part of the two-dimensional code recognized by the two-dimensional code recognition device;
change the print pattern until the recognition rate of the printed print pattern has become equal to or greater than a threshold value; and
add the print pattern having the recognition rate equal to or greater than the threshold value to the database as being an optimum print condition;
wherein a first print pattern having a minimum area is firstly printed within the preselected reference cell and a second print pattern having an area greater than the minimum area is secondly printed by way of a supplemental printing to an outer periphery of the firstly printed print pattern, thereby enlarging the print pattern on the workpiece when the firstly printed print pattern has a recognition rate smaller than the threshold value.

2. The laser marker according to claim 1, wherein in response to input data instructing to print a two-dimensional code on a workpiece, the two-dimensional code is printed on the workpiece in accordance with the optimum print condition retrieved from the database.

3. The laser marker according to claim 1, wherein an overlapping amount occurring between a first time printing and a second time printing performed in a process of changing the print pattern is measured in advance, and the supplemental printing is performed so that the overlapping amount is substantially zeroed, the overlapping amount being dependent on a material of the workpiece.

4. The laser marker according to claim 1, wherein when recognitions of the firstly printed print pattern and the secondly printed print pattern by the two-dimensional code recognition device reveal existence of an overlapping amount between a printed line segment making up the firstly printed print pattern and an adjacent print line segment making up the secondly printed print pattern and when the secondly printed print pattern has a recognition rate yet smaller than the threshold value, a third print pattern having an area larger than the area of the secondly printed print pattern is printed by way of a supplemental printing to an outer periphery of the secondly printed print pattern, thereby enlarging the print pattern on the workpiece, wherein the supplemental printing is performed to have no overlapping portion between the outer periphery of the secondly printed print pattern and an adjacent print line segment making up the thirdly printed print pattern based on the overlapping amount provided by the two-dimensional code recognition device.

5. The laser marker according to claim 1, wherein when the first print pattern is printed on the workpiece, the two-dimensional code recognition device provides a thickened amount of the print line segment making up the firstly printed print pattern relative to a diameter of the laser beam, and wherein the second print pattern is printed while referring to the thickened amount so that a print line segment making up the secondly printed print pattern does not overlap an adjacent print line segment making up the firstly printed print pattern.

6. The laser marker according to claim 1, wherein the two-dimensional code recognition device comprises an image pickup device and the controller is configured to compute the recognition rate of the print pattern printed on the workpiece based on an image captured by the image pickup device.

7. The laser marker according to claim 6, wherein the recognition rate is defined by a ratio of an area of the print pattern printed within the preselected reference cell to an area of the reference cell.

8. The laser marker according to claim 6, wherein an image of the print pattern captured by the image pickup device has an average density, the average density being used as the recognition rate.

9. The laser marker according to claim 1, wherein the two-dimensional code recognition device comprises a two-dimensional code reader.

10. The laser marker according to claim 1, wherein the print pattern printed on the workpiece is formed by a combination of a plurality of line segments, each of the plurality of line segments having a thickness changing depending upon a speed of the laser scan with respect to the workpiece.

* * * * *